(12) United States Patent
Okabayashi

(10) Patent No.: US 11,989,472 B2
(45) Date of Patent: *May 21, 2024

(54) DISPLAY CONTROL DEVICE AND IMAGE FORMING APPARATUS

(71) Applicant: KYOCERA Document Solutions Inc., Osaka (JP)

(72) Inventor: Yoshifumi Okabayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,290

(22) Filed: May 9, 2023

(65) Prior Publication Data

US 2023/0280956 A1 Sep. 7, 2023

Related U.S. Application Data

(60) Continuation of application No. 18/049,982, filed on Oct. 26, 2022, now Pat. No. 11,768,644, which is a division of application No. 17/257,519, filed as application No. PCT/JP2019/025849 on Jun. 28, 2019, now Pat. No. 11,526,316.

(30) Foreign Application Priority Data

Jul. 5, 2018 (JP) .................................. 2018-128208

(51) Int. Cl.
G06F 3/12 (2006.01)

(52) U.S. Cl.
CPC .......... *G06F 3/1256* (2013.01); *G06F 3/1258* (2013.01)

(58) Field of Classification Search
CPC ...... G06F 3/1256; G06F 3/1258; G06F 3/147; H04N 1/00411; H04N 1/00482; H04N 1/00474; H04N 1/00501; H04N 1/00437; G03G 15/502; B41J 3/46; B41J 29/38; G09G 2354/00; G09G 5/14

See application file for complete search history.

(56) References Cited

U.S. PATENT DOCUMENTS

| 8,302,016 | B2 | 10/2012 | Goto | |
|---|---|---|---|---|
| 9,191,462 | B2 | 11/2015 | Goto | |
| 2002/0136563 | A1* | 9/2002 | Maeda | ............... H04N 1/00474 399/81 |
| 2007/0300162 | A1 | 12/2007 | Goto | |
| 2012/0204097 | A1 | 8/2012 | Goto | |
| 2016/0219171 | A1* | 7/2016 | Ebitani | .............. H04N 1/00474 |

(Continued)

FOREIGN PATENT DOCUMENTS

| JP | 2006-209553 A | 8/2006 |
|---|---|---|
| JP | 2017-111504 A | 6/2017 |

*Primary Examiner* — Iriana Cruz

(74) *Attorney, Agent, or Firm* — Studebaker & Brackett PC

(57) ABSTRACT

A display control device includes a display section and a display controller. The display controller controls the display section so as to cause the display section to display a first image (703a to 703f) and a second image. The first image (703a to 703f) is displayed in an upper layer for the second image. The first image (703a to 703f) represents a category item. The second image represents a setting item belonging to the category item. The display controller controls the display section so as to cause the display section to display a predetermined image (705) in the first image (703a to 703f) according to the setting item that has been entered.

4 Claims, 9 Drawing Sheets

(56) References Cited

U.S. PATENT DOCUMENTS

2016/0283827 A1 9/2016 Sano
2016/0306597 A1* 10/2016 Sakuraba .............. G06F 3/1255
2017/0168669 A1 6/2017 Ohira

* cited by examiner

DISPLAY CONTROL DEVICE AND IMAGE FORMING APPARATUS

CROSS-REFERENCE TO RELATED APPLICATIONS

The present application is a Continuation of U.S. patent application Ser. No. 18/049,982 filed Oct. 26, 2022, which is a Divisional of U.S. patent application Ser. No. 17/257,519 filed Dec. 31, 2020, which is the U.S. National Phase Application of International Application No. PCT/JP2019/025849, filed Jun. 28, 2019, which claims priority under 35 U.S.C. § 119 to Japanese Patent Application No. 2018-128208, filed on Jul. 5, 2018. The contents of this application are incorporated herein by reference in their entirety.

TECHNICAL FIELD

The present invention relates to a display control device and an image forming apparatus.

BACKGROUND ART

An image forming apparatus includes multiple functions. Examples of the multiple functions include a printing function, a copy function, a scanner function, and a facsimile machine (FAX) function. The image forming apparatus includes an image forming section, storage, and a display section. The storage stores therein settings entered in setting items of the multiple functions. The image forming section forms a target image based on the settings stored in the storage. Examples of the target image include an image at a target magnification and a target color image.

In order to obtain a target image with the image forming apparatus, a user causes the display section to display a detailed setting image representing the setting items. The user changes the stored settings to desired settings using the detailed setting image. The storage stores therein new settings. The image forming apparatus accordingly forms an image based on the new settings.

On the other hand, a disclosed display device causes a display section to preferentially display information of high importance to a user (for example, see Patent Literature 1). The display device described in Patent Literature 1 includes a controller, storage, and the display section. The storage stores therein conditions with priorities assigned thereto. The controller detects high priority information to be displayed on the display section.

The user may change a stored setting(s) to a new setting(s), and subsequently further change the new setting(s). The user accordingly causes the display section to display a detailed setting image.

CITATION LIST

Patent Literature

Patent Literature 1: JP2006-209553 A

SUMMARY OF INVENTION

Technical Problem

There are however multiple setting items in the image forming apparatus. This makes it difficult to find a setting item(s) entered from the multiple setting items.

The present invention has been achieved in view of the above circumstances, and an object thereof is to provide a display control device and an image forming apparatus, capable of easily finding a setting item that has been entered.

Solution to Problem

A display control device according to an aspect of the present invention includes a display section and a display controller. The display controller controls the display section so as to cause the display section to display a first image and a second image. The first image is displayed in an upper layer for the second image. The first image represents a category item. The second image represents a setting item belonging to the category item. The display controller controls the display section so as to cause the display section to display a predetermined image in the first image according to the setting item that has been entered.

An image forming apparatus according to an aspect of the present invention includes an image forming section and the above-described display control device. The image forming section forms an image on a recording medium. The setting item is an item on formation of the image.

Advantageous Effects of Invention

In the present invention, it is possible to easily find the setting item that has been entered.

DESCRIPTION OF EMBODIMENTS

Figure 1:
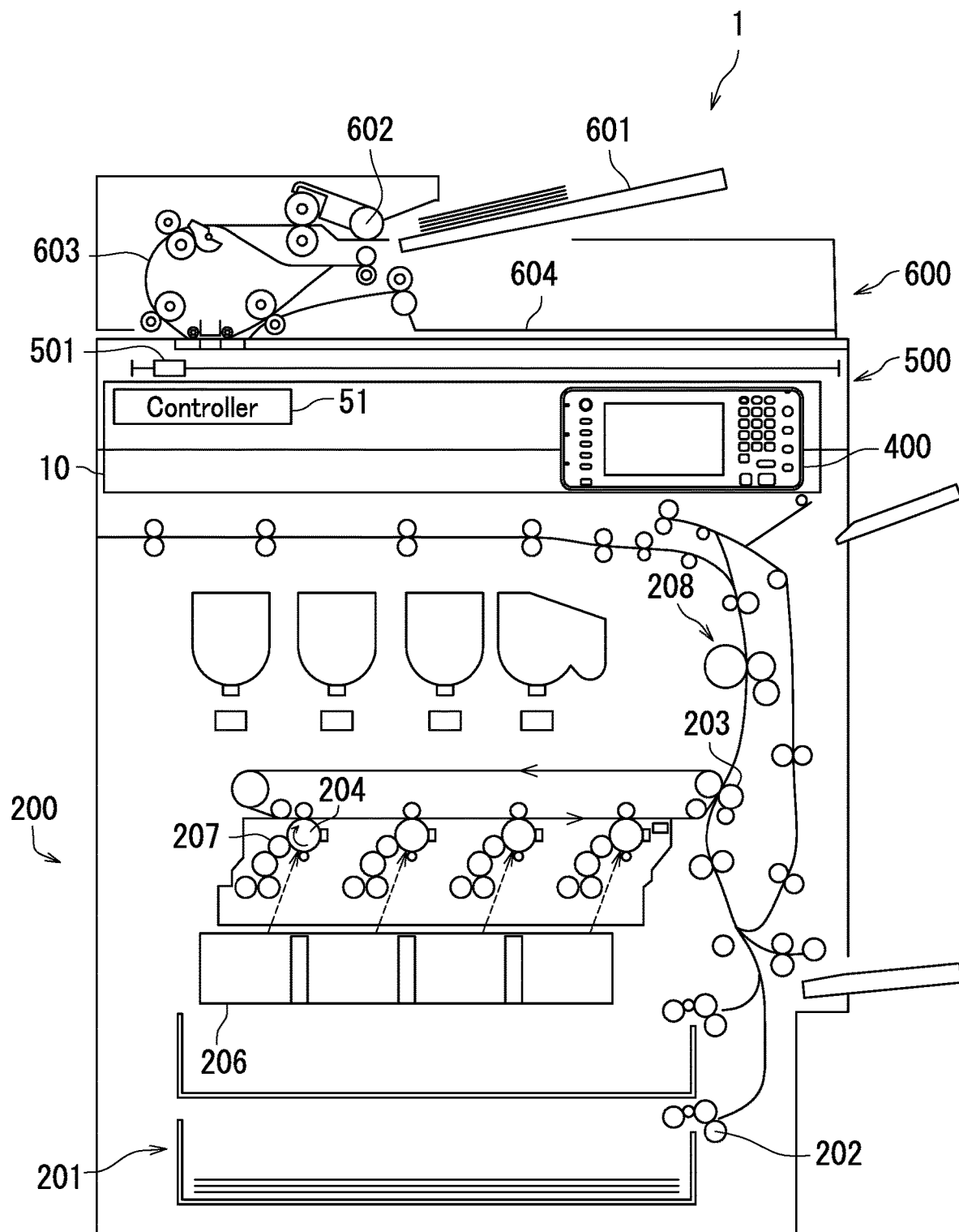
FIG. 1 is a schematic sectional view of an image forming apparatus according to an embodiment of the present invention.

An embodiment of the present invention will be described with reference to the accompanying drawings. Note that the embodiment to be described below is not intended to limit the invention in the scope of claims. Not all of constituent elements described in the embodiment are necessarily essential to the solution of the invention. The same reference numerals denote the same constituent elements throughout the drawings.

A configuration of the present invention will first be described with reference to FIG. 1. FIG. 1 is a schematic sectional view of an image forming apparatus 1 according to the embodiment of the present invention. As illustrated in FIG. 1, the image forming apparatus 1 is a multifunction peripheral. The image forming apparatus 1 has for example a printing function, a copy function, a scanner function, and a FAX function.

The image forming apparatus 1 includes a main body section 200, a document reading section 500, a document feed section 600, and a display control device 10. The display control device 10 includes an operation display section 400 and a controller 51.

The document reading section 500 includes a scanner 501. The document feed section 600 includes a document loading section 601, a sheet feed roller 602, a document conveyance section 603, and a document exit tray 604. The sheet feed roller 602 sends out, one at a time, a specific number of documents that are set on the document loading section 601. The document conveyance section 603 sequentially conveys, to a scanning location of the scanner 501, the documents sent out. The scanner 501 sequentially reads images of the documents conveyed. The documents read are ejected on the document exit tray 604.

The main body section 200 includes a sheet feed cassette 201, a sheet feed roller 202, a transfer roller 203, photosensitive drums 204, a light exposure device 206, development devices 207, a fixing roller 208, and an exit tray (not illustrated).

The photosensitive drums 204 are uniformly charged by a charger (not illustrated) while rotating in an arrow direction in the drawing. The light exposure device 206 scans each photosensitive drum 204 with laser light to form an electrostatic latent image for each color on a surface of the photosensitive drum 204. A development device 207 supplies black developer to a corresponding photosensitive drum 204 to form a toner image.

The sheet feed roller 202 pulls out, one at a time, paper from the sheet feed cassette 201 containing the paper to feed the paper to the transfer roller 203. The paper is one example of a recording medium. The transfer roller 203 transfers a toner image on each photosensitive drum 204 to the paper fed. The fixing roller 208 heats the toner image transferred to fix the toner image to the paper. After the toner image is fixed to the paper, the paper is ejected on the exit tray.

Figure 2:
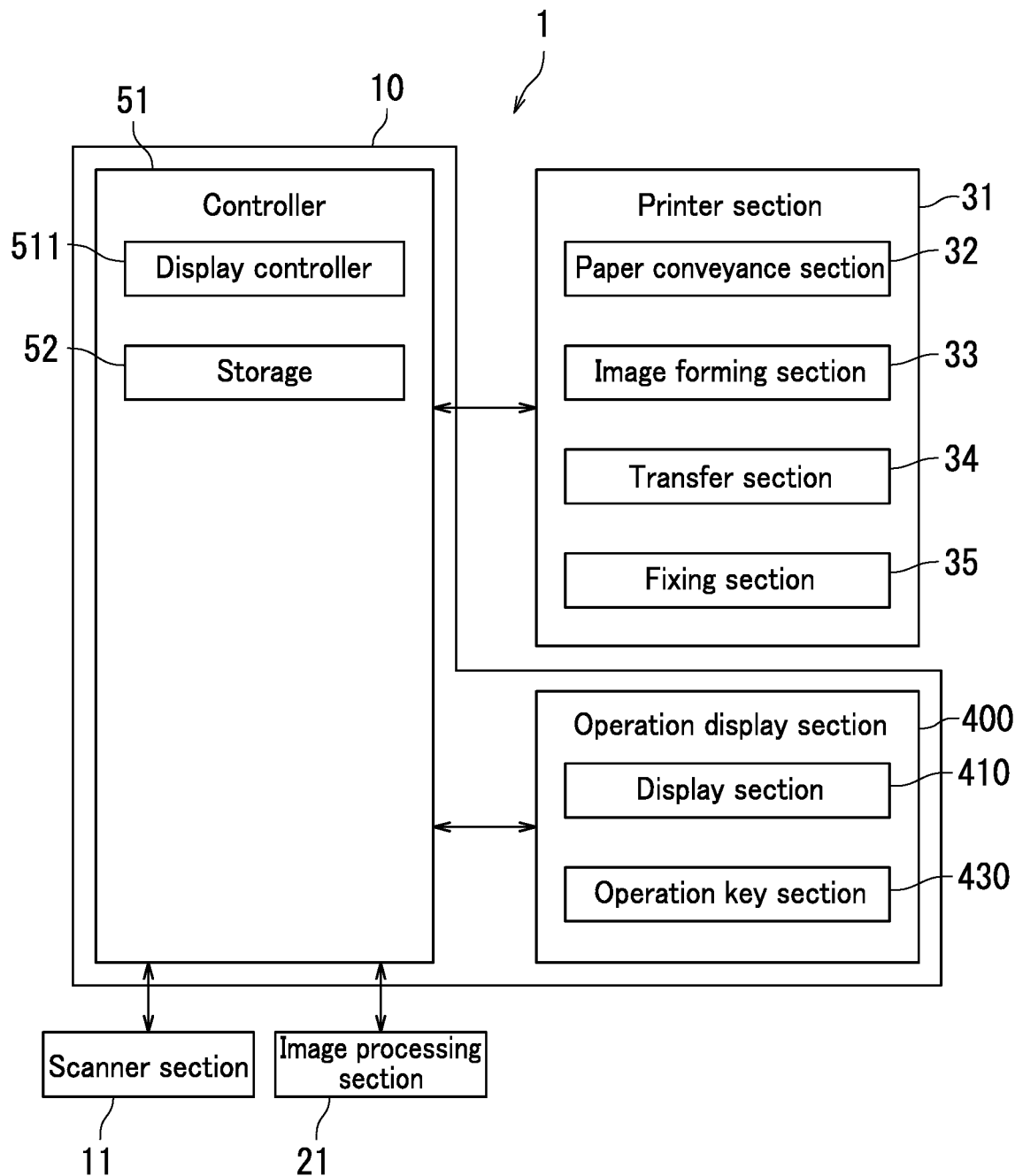
FIG. 2 is a block diagram of the image forming apparatus depicted in FIG. 1.

FIG. 2 is a block diagram of the image forming apparatus 1 depicted in FIG. 1. As illustrated in FIG. 2, the image forming apparatus 1 includes a scanner section 11, an image processing section 21, and a printer section 31 in addition to the display control device 10.

The scanner section 11 gives light to a document with an exposure lamp and receives reflected light with a charge coupled device (CCD), thereby reading an image from the document to provide the image read to the image processing section 21.

The image processing section 21 processes the image read, based on information stored in the controller 51. The image processed through the image processing section 21 is provided to the printer section 31.

The printer section 31 includes a paper conveyance section 32, an image forming section 33, a transfer section 34, and a fixing section 35. The paper conveyance section 32 includes the sheet feed cassette 201 and the sheet feed roller 202. The image forming section 33 includes the photosensitive drums 204, the light exposure device 206, and the development devices 207. The transfer section 34 includes the transfer rollers 203. The fixing section 35 includes the fixing roller 208.

The controller 51 includes a processor (not illustrated) and storage 52. The processor includes for example a central processing unit (CPU).

The storage 52 includes read only memory (ROM), random access memory (RAM), and a secondary storage device. The secondary storage device is a nonvolatile storage device whose examples include a hard disk drive and flash memory. The ROM of the storage 52 stores therein different computer programs to be executed by the controller 51. The controller 51 loads the different computer programs stored in the ROM into the RAM to execute the computer programs, thereby realizing functions of the controller 51.

Figure 3:
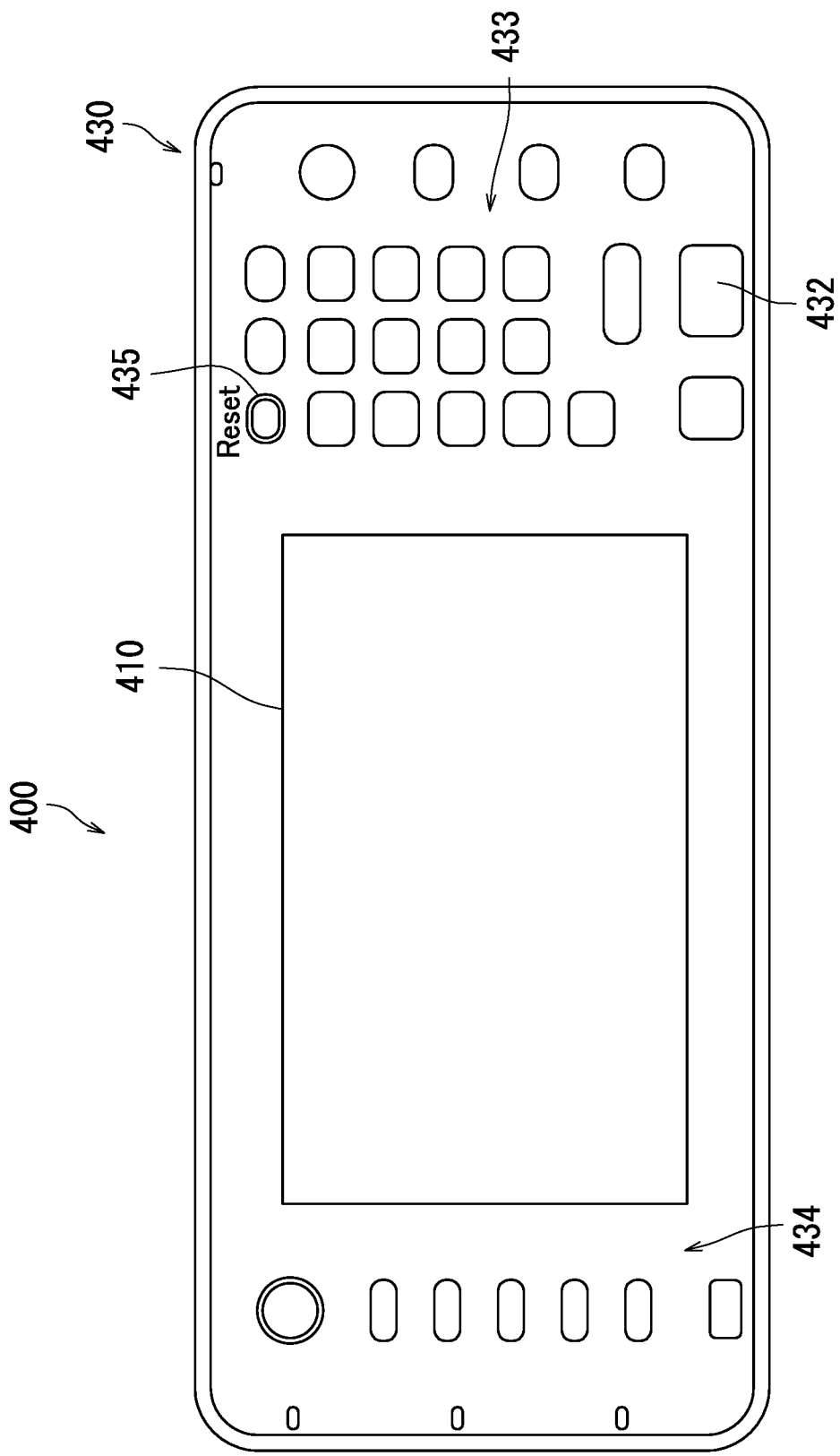
FIG. 3 is a partial enlarged view of an operation display section in the present embodiment.

The operation display section 400 will next be described with reference to FIG. 3. FIG. 3 is a partial enlarged view of the operation display section 400. As illustrated in FIG. 3, the operation display section 400 includes a display section 410 and an operation key section 430.

The display section 410 includes a liquid crystal display (LCD). As one example, the display section 410 is a touch panel having a display function and an input function of detecting a touch operation. The display section 410 displays different operation images under control of the controller 51. Different execution commands are entered in the controller 51 as a result of the user touching the operation images on the display section 410.

The operation key section 430 allows the user to enter therethrough an input operation. The operation key section 430 includes a start key 432, a numeric keypad 433, function switching keys 434, and a reset key 435.

The start key 432 allows the user to enter therethrough an instruction to start an operation such as a copy operation or a scan operation. The numeric keypad 433 allows the user to enter therethrough an instruction representing the number of copies. The function switching keys 434 allow the user to enter therethrough an instruction to switch between functions. Here, the functions include a printing function, a copy function, a scanner function, and a FAX function. The reset key 435 allows the user to enter therethrough a reset operation.

Information stored in the storage 52 will hereinafter be described. The storage 52 stores therein information on multiple setting items for each of functions whose examples include the printing function, the copy function, the scanner function, and the FAX function, in order that the user obtains a target image. The multiple setting items are items on an image. The multiple setting items represent for example magnification settings, color settings, and N-in-1 (combine) settings.

A setting is set for each of the setting items at a timing according to an input operation from the user. Examples of the timing include immediately before the user obtains the target image. That is, one or more settings are newly set so that a desired target image is obtained. For example, the user sets "100%" as a setting at the magnification settings, sets "full color" as a setting at the color settings, and sets "2-in-1" as a setting at the combine settings, thereby enabling obtaining the target image.

Not that a setting at the "magnification settings" is for example a numerical value (for example "100%") representing the size of the target image with the size of the document being 100%. Examples of the setting at the "color settings" include a setting representing a full color mode ("full color"), a setting representing a monochrome mode ("monochrome"), and a setting representing an automatic color mode ("automatic color").

The storage 52 further stores therein information on category items (for example six category items). The multiple setting items are classified into any one of the category items.

Figure 4:
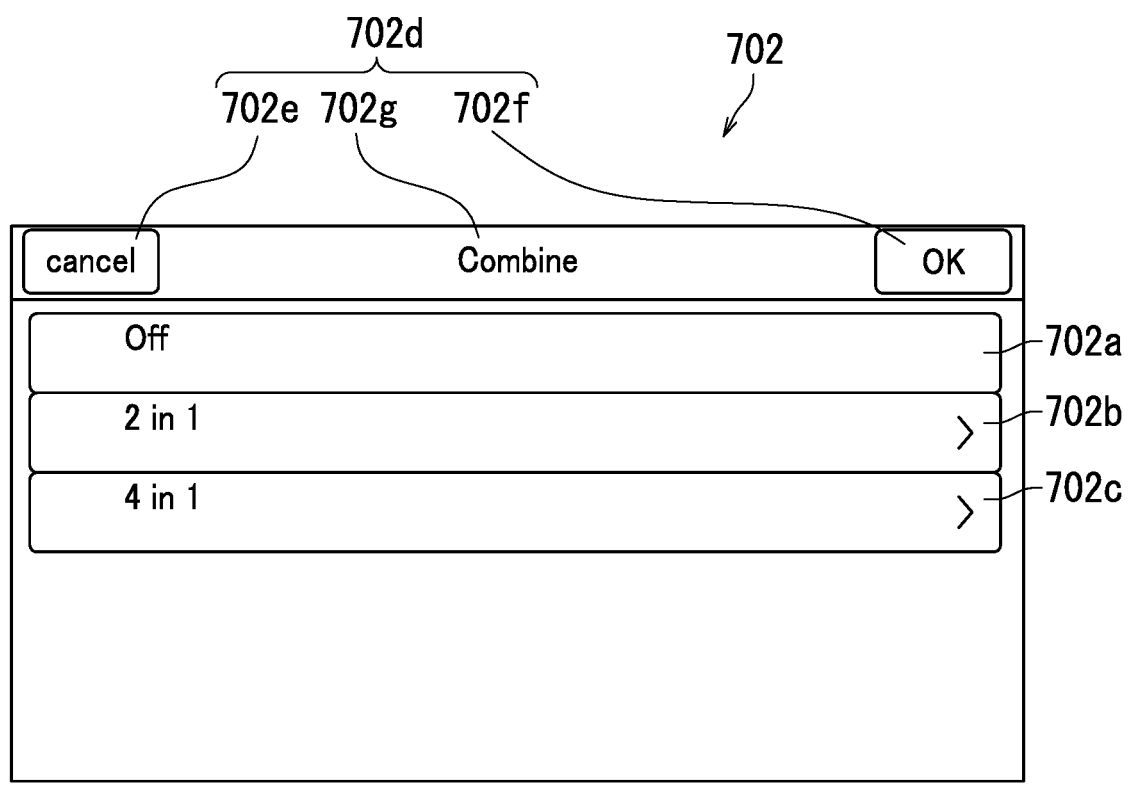
FIG. 4 illustrates a detailed setting image representing a setting item "Combine" in the present embodiment.

A method of changing a setting entered in a setting item will next be described with reference to FIGS. 4 and 5. The changing of the setting is performed by using an operation image displayed on the display section 410. The operation image includes a category item list image 701 and detailed setting images 702 (each of which corresponds to a second image). The category item list image 701 represents a list of category items. Each detailed setting image 702 represents a setting item.

The detailed setting images 702 will first be described. FIG. 4 illustrates a detailed setting image 702 representing a setting item "Combine". As illustrated in FIG. 4, the detailed setting image 702 includes a header area 702d, an "Off" button 702a, a "2-in-1" button 702b, and a "4-in-1" button 702c. The header area 702d includes a "cancel" button 702e, an "OK" button 702f, and a heading "Combine" 702g. The "Off" button 702a is a button for setting one page sheet to be printed on each page of paper. The "2-in-1" button 702b is a button that causes the image forming section 33 to form two pages of a print target on one page sheet of paper. The "4-in-1" button 702c is a button that causes the image forming section 33 to form four pages of a print target on one page sheet of paper. The detailed setting image 702 allows the user to set any one of a setting "Off", a setting "2-in-1", and a setting "4-in-1" in the setting item "Combine" according to an input operation by the user.

Figure 5:
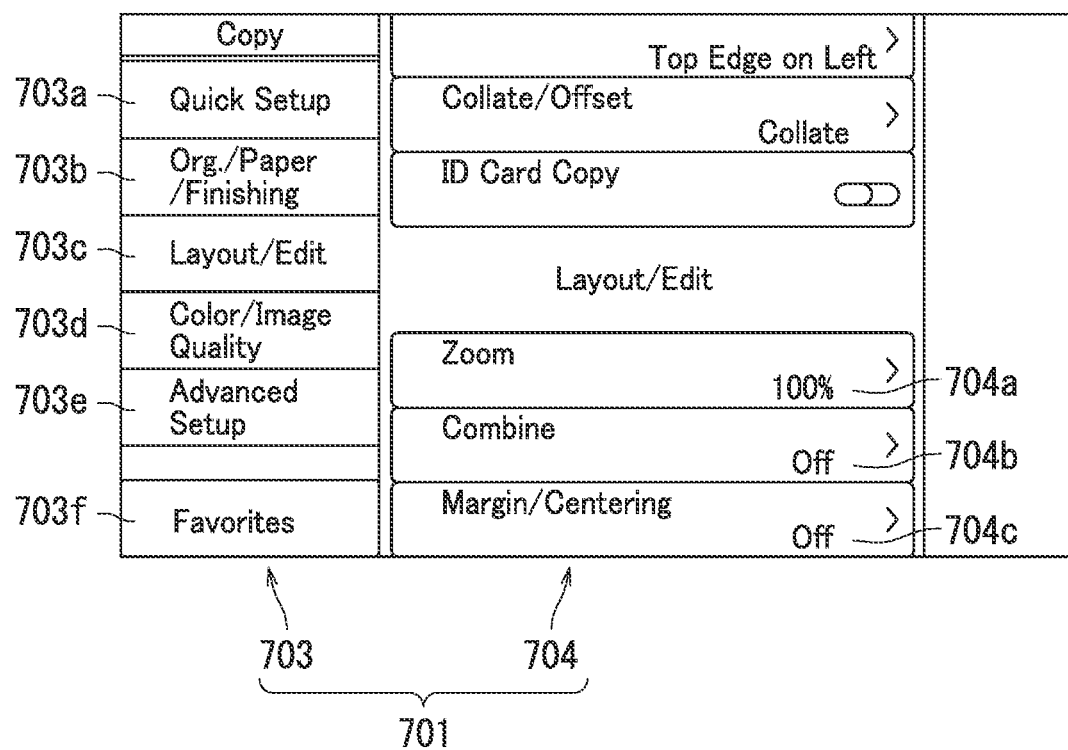
FIG. 5 illustrates a category item list image in the present embodiment.

FIG. 5 illustrates the category item list image 701. As illustrated in FIG. 5, the category item list image 701 includes a navigation area 703 and a main area 704. The navigation area 703 includes category item images (for example six category item images) 703a to 703f (each of which corresponds to a first image). Each of the category item images 703a to 703f represents a category item. The category item images 703a to 703f respectively represent for example a "Quick Setup" button 703a, an "Org./Paper/Finishing" button 703b, a "Layout/Edit" button 703c, a "Color/Image Quality" button 703d, an "Advanced Setup" button 703e, and a "Favorites" button 703f.

The main area 704 includes multiple setting item images 704a to 704c. The multiple setting item images 704a to 704c represent for example a "Zoom" button 704a, a "Combine" button 704b, and a "Msrgin/Centering" button 704c, respectively. Each of the multiple setting item images 704a to 704c represents a setting item. Note that the size of the main area 704 is determined according to the size of the display section 410. The main area 704 cannot however display the whole number of the setting item images because the setting item images are large in number. The main area 704 accordingly displays a predetermined number of setting item images 704a to 704c of the multiple setting item images. The predetermined number of setting item images 704a to 704c to be displayed in the main area 704 are switched as a result of the user performing an up or down scroll operation.

A configuration of the controller 51 will then be described with reference to FIGS. 2, 4, and 5. The controller 51 includes a display controller 511 in addition to the storage 52.

The display controller 511 controls the display section 410 so as to cause the display section 410 to display the category item list image 701 or a detailed setting image 702 based on an input operation. The display controller 511 first causes the display section 410 to display the category item list image 701 (see FIG. 5). The user pushes one category item image of the category item images 703a to 703f, and the display controller 511 then scrolls an image of the main area 704. Thus, the display controller 511 causes the display section 410 to display, in the main area 704, the setting item images 704a to 704c, representing setting items belonging to the category item, of the multiple setting item images. For example, when the "Layout/Edit" button 704c is pushed, the image displayed in the main area 704 is automatically scrolled. As a result, for example, the "Zoom" button 704a, the "Combine" button 704b, and the "Msrgin/Centering" button 704c, representing setting items belonging to a category item "Layout/Edit" are displayed in the main area.

In contrast, the user pushes one setting item image of the multiple setting item images 704a to 704c, and the display controller 511 then switches between images. That is, the display controller 511 causes the display section 410 to display a detailed setting image 702 associated with the one setting item image 704a to 704c (see FIG. 4). For example, an image of the display section 410 is switched when the "Combine" button 704b is pushed. That is, the display section 410 displays the detailed setting image 702 representing the setting item "Combine". Here, the category item list image 701 is displayed in an upper layer for the detailed setting image 702. The setting item images 704a to 704c displayed in the upper layer are associated with the detailed setting image 702 displayed in a lower layer.

When the user pushes the "Off" button 702a to the "OK" button 702f with the detailed setting image 702 displayed, one or more settings entered in the setting item are changed. In the present embodiment, according to a setting item that has been entered, the display controller 511 controls the display section 410 so as to cause the display section 410 to display a predetermined image 705 in a corresponding first image. Specifically, when one or more settings are changed, the display controller 511 controls the display section 410 so as to cause the display section 410 to display the category item list image 701 to which one or more predetermined image 705 are added. Moreover, the display controller 511 causes the storage 52 to store therein the predetermined image 705 and the changed setting item with the predetermined image 705 associated with the changed setting item.

Figure 6:
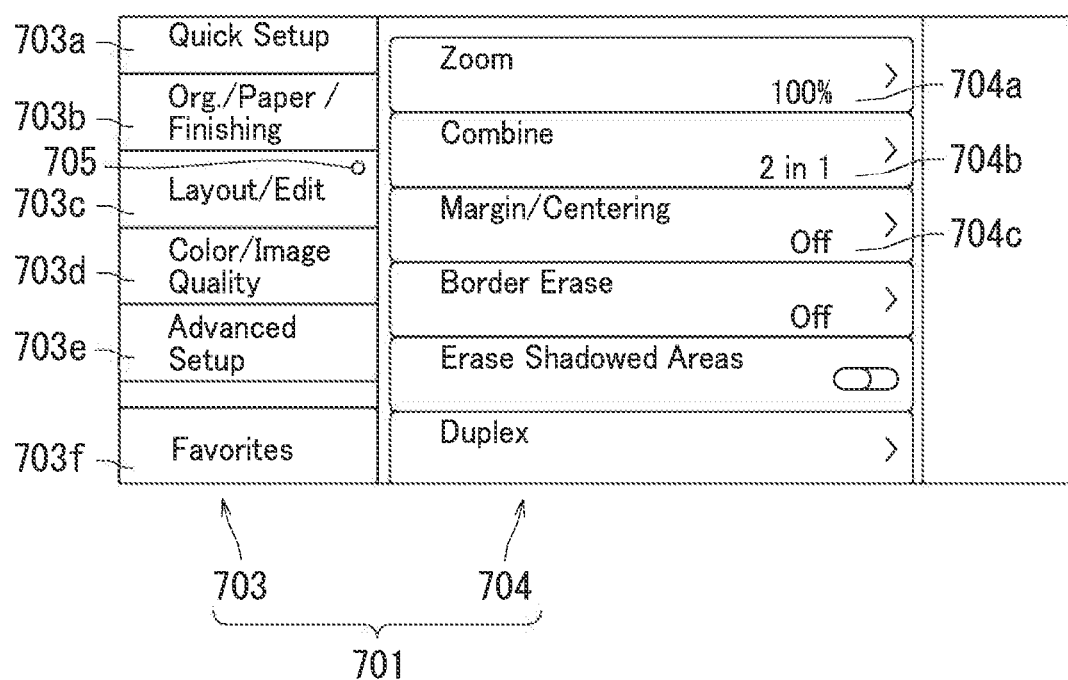
FIG. 6 illustrates the category item list image in which one mark image (predetermined image) is displayed, in the present embodiment.

FIG. 6 illustrates the category item list image 701 in which one mark image 705 (predetermined image) is displayed. As illustrated in FIG. 6, the one mark image 705 is further displayed at the upper right of the category item image 703c. The mark image 705 is displayed in the category item image 703c representing the category item to which a corresponding setting item belongs. Examples of the predetermined image 705 include a circle mark image, a quadrilateral mark image, an arrow image, and a frame image. The mark image 705 is displayed, so that the user can recognize that one or more settings entered in one or more setting items belonging to the category item have been changed. This enables the user to easily find the setting item image 704a to 704c representing the setting item whose setting has been changed, and the detailed setting image 702.

Figure 7:
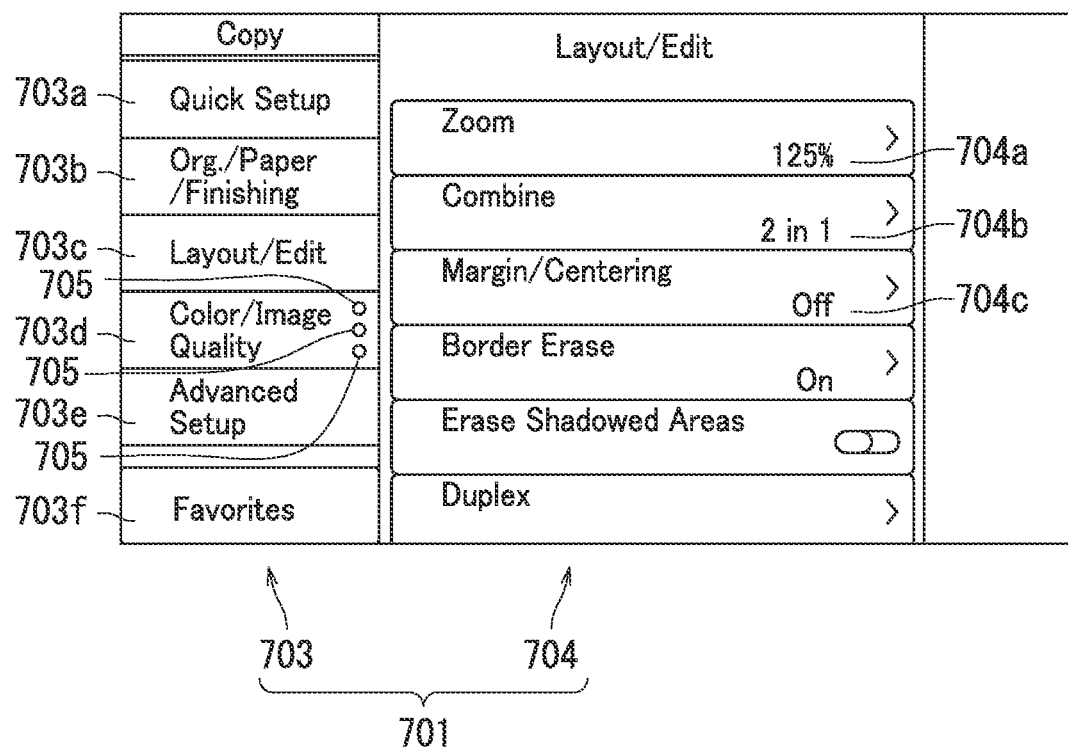
FIG. 7 illustrates the category item list image in which mark images are displayed, in the present embodiment.

FIG. 7 illustrates the category item list image 701 in which mark images 705 are displayed. As illustrated in FIG. 7, three mark images 705 are displayed on the right of the category item image 703c. The three mark images 705 depicted in FIG. 7 are displayed, so that the user can recognize that the settings entered in three setting items (same number as the number of mark images 705) belonging to the category item have been changed.

In addition, according to any of the mark images 705 touched, the display section 410 is controlled by the display controller 511 so as to display corresponding second images. Specifically, when any of the mark images 705 is pushed, the display controller 511 controls the display section 410 so as to cause the display section 410 to display the setting item images 704a to 704c associated with the mark images 705.

For example, when the mark image 705 on the upper right in the category item image 703c is pushed, the display controller 511 scrolls the image of the main area 704. That is, the display controller 511 causes the display section 410 to display, in the main area 704, the setting item images 704a to 704c associated with the mark images 705. This enables the display section 410 to display, in the main area 704, the setting item images representing the setting items whose respective settings have been changed, of the multiple setting item images 704a to 704c. The display controller 511 may further cause the display section 410 to display a detailed setting image 702 associated with any of the setting item images 704a to 704c. Note that the display controller 511 scrolls the image of the main area 704 when an area of the category item image 703c other than the mark images 705 is pushed. That is, the display section 410 displays, in the main area 704, the setting item images 704a to 704c representing the setting items belonging to the category item.

Figure 8:
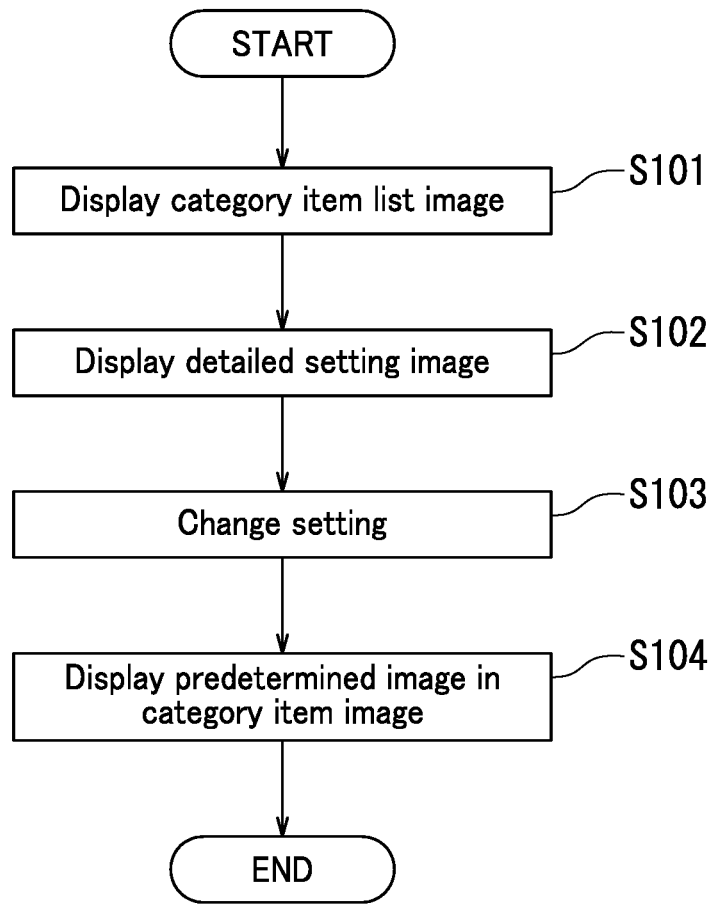
FIG. 8 is a flowchart depicting a process of a controller in the present embodiment.

A process of the controller 51 in the present embodiment will next be described with reference to FIG. 8. FIG. 8 is a flowchart depicting the process of the controller 51 in the present embodiment. The process of the controller 51 includes Steps S101 to S104. As illustrated in FIG. 8, at Step S101, the display controller 511 first causes the display section 410 to display the category item list image 701.

Then at Step S102, when the user pushes a setting item image 704a to 704c, the display controller 511 causes the display section 410 to display a corresponding detailed setting image 702.

Then at Step S103, when the user performs an input operation to enter a setting in a detailed setting image 702, the display controller 511 changes a setting entered in a corresponding setting item.

Then at Step S104, the display controller 511 controls the display section 410 so as to cause the display section 410 to display a mark image 705. The mark image 705 is displayed in a category item image 703a to 703f representing the category item to which the setting item belongs. After the display controller 511 controls the display section 410 so as to cause the display section 410 to display the mark image 705 in the category item image 703a to 703f, the process ends.

As described above with reference to FIGS. 1 to 8 in the present embodiment, the category item list image 701 includes a category item image 703a to 703f to which one or more mark images 705 are added. It is therefore possible to easily find one or more setting item images 704a to 704c representing one or more setting items whose respective settings have been changed, and corresponding detailed setting images 702.

As above, the embodiment of the present invention has been described with reference to the drawings. However, the present invention is not limited to the above-described embodiment and can be practiced in various ways within the scope without departing from the essence of the present invention (for example, (1) to (3) below). The drawings mainly illustrate schematic constituent elements in order to facilitate understanding, and properties such as thickness, length, numbers or the like of each constituent element illustrated in the drawings may differ from actual properties thereof in order to facilitate preparation of the drawings. Further, the shape, dimensions, and the like of each constituent element described in the above embodiment are merely examples that do not impose any particular limitations and may be altered in various ways as long as such alterations do not substantially deviate from the configuration of the present invention.

(1) In the present embodiment, when one or more settings are changed, the display controller 511 causes the display section 410 to display one or more mark images 705 in a corresponding category item image 703a to 703f. Alternatively or additionally, when one or more settings are changed, the display controller 511 may cause the display section 410 to display a numerical image 706 in a corresponding category item image 703a to 703f.

Figure 9:
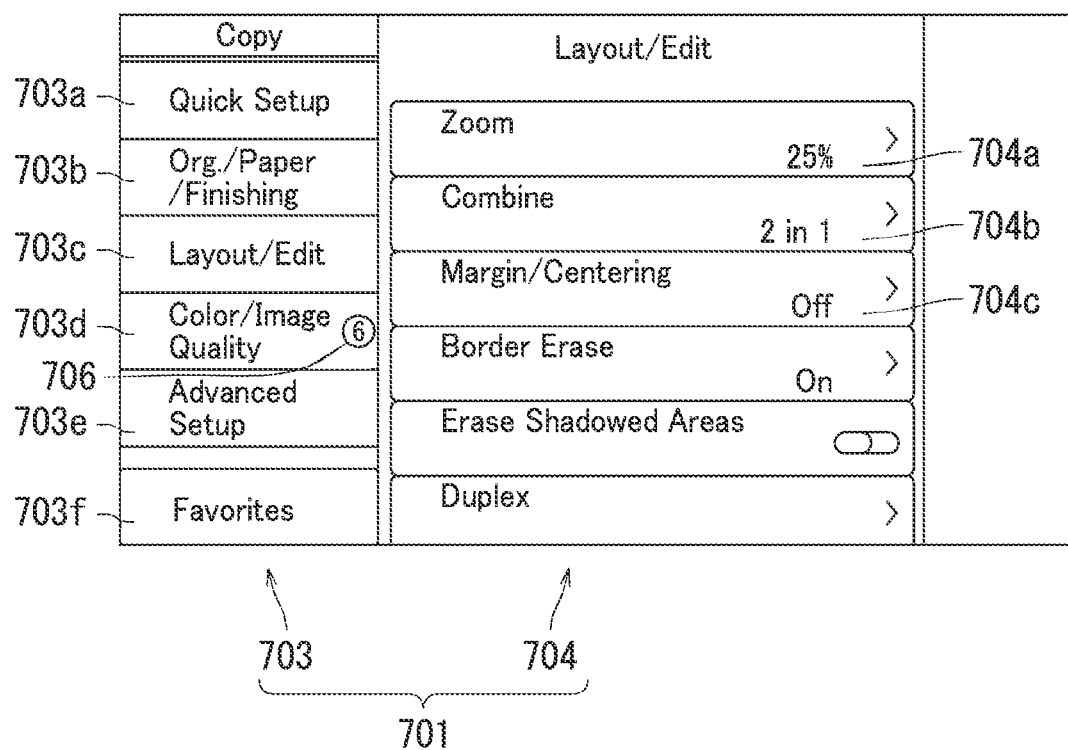
FIG. 9 illustrates the category item list image in which a numerical image is displayed, in the present embodiment.

FIG. 9 illustrates the category item list image 701 in which the numerical image 706 is displayed. As illustrated in FIG. 9, the numerical image 706 is displayed on the right of the category item image 703c. In the present embodiment, the numerical image 706 represents the numeral 6. That is, displaying the numerical image 706 enables the user to recognize that respective settings have been changed at six setting items belonging to the category item. The display controller 511 may further include a determination section. The determination section determines the number of settings that have been changed. The determination section causes the display section 410 to display one or more mark images 705 if the number of settings that have been changed is less than a predetermined number, and to display the numerical image 706 if the number of settings is greater than or equal to the predetermined number.

(2) In the present embodiment, one or more mark images 705 are displayed in the category item list image 701 that is displayed in the upper layer for the detailed setting image 702. Alternatively, when a top layer image is displayed in an upper layer for the category item list image 701, one or more mark images 705 may be displayed in the top layer image.

(3) In the present embodiment, the image forming apparatus 1 is not limited to the multifunction peripheral. Examples of the image forming apparatus 1 may further include a copier, a facsimile machine, and a printer. Although the configuration where the image forming apparatus 1 is provided with the display control device 10 has been described, the invention is not limited to this. The display control device 10 may be replaced with a device whose example include a smartphone, a tablet computer, a CD player, a DVD player, and various home appliances.

INDUSTRIAL APPLICABILITY

The present invention relates to a display control device and an image forming apparatus, and has industrial applicability.

The invention claimed is:
1. A display control device comprising
a display section, and
a processor, wherein
the processor is configured to:
control the display section so as to cause the display section to display
a first image representing a category item,
a second image that is displayed in a lower layer for the first image and that represents a setting item belonging to the category item, and
a third image that is displayed in an upper layer for the first image and that does not include the first image, the first image being displayed by switching from the third image; and
control the display section so as to cause the display section to display the first image together with one or more predetermined images that are added to the first image when the setting item is entered and that are not displayed with the first image before the setting item is entered and display the third image together with one or more predetermined images that are added to the third image when the setting item is entered and that are not displayed with the third image before the setting item is entered, the second image is provided as one or more second images, the one or more predetermined images are associated with a corresponding one of the one or more second images, the display section includes a touch panel, and the processor controls the display section so as to cause the display section to, according to a predetermined image of the one or more predetermined images which has been touched, display a corresponding second image of the one or more second images.

2. The display control device according to claim 1, wherein the predetermined image represents a number of one or more setting items that have been entered.

3. The display control device according to claim 1, wherein the predetermined image is one or more circle mark images, one or more quadrilateral mark images, one or more arrow images, or one or more frame images.

4. The display control device according to claim 1, wherein the processor controls the display section so as to cause the display section to display first images.

* * * * *